Figure 1:
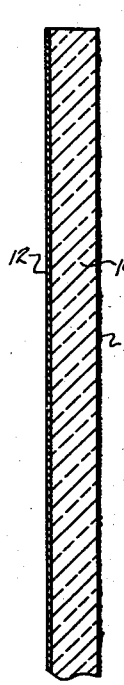

Nov. 24, 1942.   A. McK. GREAVES-WALKER   2,303,120
GLASS CHALKBOARD
Filed June 25, 1940

Inventor
ARTHUR McK. GREAVES-WALKER, Dec'd.
BY ADELAIDE M. GREAVES-WALKER, Execx.
By
Frank Fraser
Attorney Patented Nov. 24, 1942

2,303,120

UNITED STATES PATENT OFFICE 2,303,120

GLASS CHALKBOARD

Arthur McK. Greaves-Walker, deceased, late of Toledo, Ohio, by Adelaide M. Greaves-Walker, executrix, Toledo, Ohio, assignor to The Libbey-Owens-Ford Glass Company, Toledo, Ohio, a corporation of Ohio Application June 25, 1940, Serial No. 342,255

10 Claims. (Cl. 35—66)

The present invention relates to chalkboards, such as are commonly used in schools, lecture rooms, etc., and has for its aim the provision of such a chalkboard having improved qualities of durability, efficiency, economy of construction, and safety.

The chalkboard concerned includes a facing member comprising a sheet or plate of substantially colorless glass and a backing therefor comprising a relatively thin layer of plastic material of the desired color which is visible through said sheet or plate. The front surface of the glass sheet or plate is ground, etched, or otherwise suitably treated or roughened to provide a writing surface which is capable of taking chalk as well as being readily cleanable.

An important object of the invention is to provide a backing for the glass facing sheet or plate comprising a special type of plastic adhesive material which can be readily and conveniently applied to the glass and which will firmly adhere thereto.

Another important object of the invention is to provide a backing of plastic adhesive material which is stable, impervious to moisture, unaffected by atmospheric changes, and possessing sufficient ductility and elasticity to accommodate relative expansion and contraction of the glass.

A further important object of the invention is to provide a backing of plastic adhesive material which will effectually serve its purpose over a long period of time without deterioration and which also serves to greatly increase the resistance of the glass facing sheet or plate to shock or blows as well as acting to retain the pieces of glass against flying or scattering in much the same manner as laminated safety glass in the event the facing sheet or plate should become accidently broken.

Other objects and advantages of the invention will become more apparent during the course of the following description, when taken in connection with the accompanying drawing.

Figure 2:
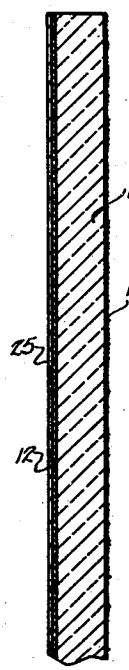
Figure 3:
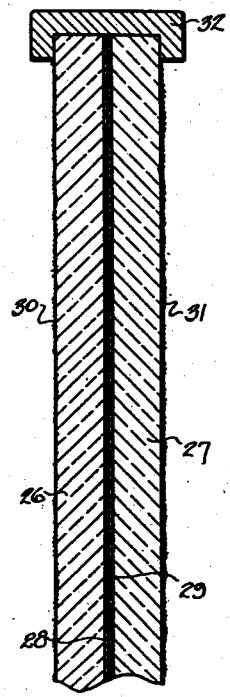
Figure 4:
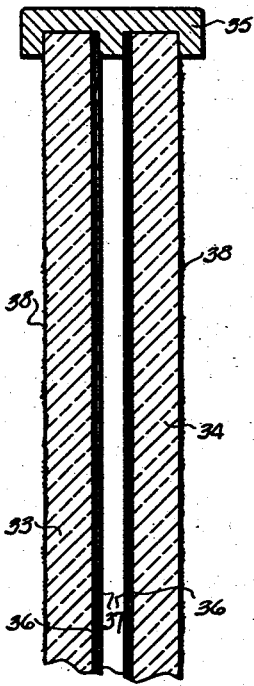
Figure 5:
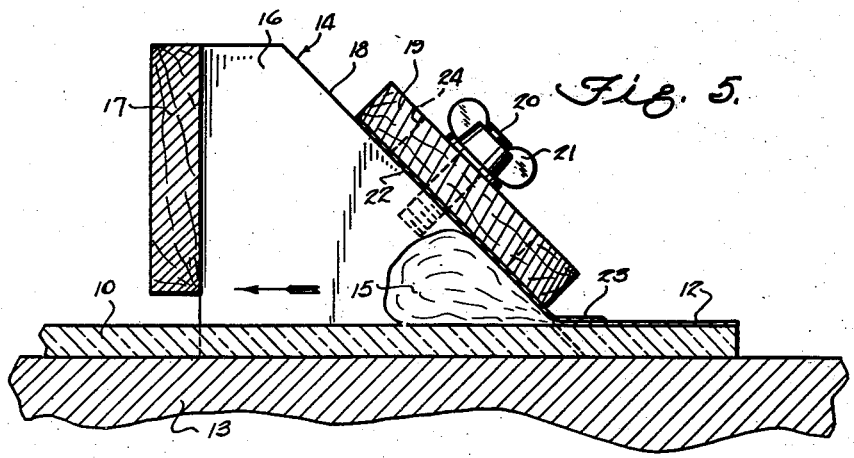

In the drawing, wherein like numerals are employed to designate like parts throughout the same:

Fig. 1 is a cross sectional view of one form of chalkboard embodying the present invention;

Figs. 2, 3, and 4 are similar views showing alternate forms of chalkboards also embodying the invention; and Fig. 5 is a cross sectional view of one type of apparatus which may be employed for applying the adhesive backing material to the glass facing sheet or plate.

With reference now to the drawing and particularly to Fig. 1, there is shown a chalkboard including a facing member 10 comprising a sheet or plate of substantially colorless glass and having the front surface 11 thereof ground, etched, sand-blasted, or roughened in any desired manner to provide a suitable writing surface. The invention is not restricted to any particular type of writing surface or method of forming the same so long as it properly takes the chalk and permits the satisfactory erasure thereof. The back surface of the glass sheet or plate is preferably smooth and has applied thereto the backing 12 comprising a relatively thin layer of a special type of plastic adhesive material which adheres firmly to the glass surface.

The adhesive material forming the backing 12 comprises a plastic compound composed of two basic ingredients, namely, a rubber (latex) paste and a dehydrating powder. The concentrated latex paste and powder are separately prepared and then mixed together in predetermined proportions to form a plastic mix of the desired consistency. The dehydrating powder is in the form of a self-setting cement which sets up upon absorption of the water from the latex paste. The consistency of the adhesive is dependent upon the proportions of paste and powder used and may be varied over a relatively wide range.

Broadly stated, the paste comprises a specially prepared latex of high but variable concentration having a low protein content which is suitably stabilized and preserved by a relatively small amount of ammonia as well as by the use of caustic alkali. As a specific example, one form of paste which I have used with good results is a concentrated latex paste having a dry rubber content of approximately 68% to 70% and will also ordinarily contain other solid materials amounting to approximately 1.5%. These solids, other than the dry rubber, which constitute the 1.5% are caustic alkali as well as naturally occurring proteins which are always found in latex. The proportions of these ingredients are approximately in the ratio of 0.8% protein material to 0.7% of caustic alkali calculated as potassium hydroxide. The balance of the paste consists of water containing a relatively small amount of ammonia which may be approximately 0.05%.

Summarizing and by way of example, this paste comprises the following ingredients in the approximate proportions given:

| | Per cent |
|---|---|
| Dry rubber | 68.45 |
| Water | 30. |
| Ammonia | 0.05 |
| Natural proteins | 0.8 |
| Caustic alkali (KOH) | 0.7 |

The powder consists almost entirely of a high alumina cement that sets by hydration. To this high alumina cement are added suitable and variable amounts of sulfur or other vulcanizing agents such as selenium, etc. Also, to the powder is added suitable accelerators capable of bringing about vulcanization without the application of heat such as "Butyl Zimate," zinc butyl xanthate, etc. It is likewise desirable to add to the powder in variable proportions, suitable antioxidants such as "Age-rite White," phenyl beta naphthylamine, indanyl resorcinol (sold in the trade as RR5), etc.

More particularly, the powder is composed of inorganic and organic materials, with the inorganic material comprised approximately 98% of the powder. An analysis of one form of powder used by me with excellent results in conjunction with the concentrated latex paste described above shows the inorganic material to consist of:

|  | | Per cent |
|---|---|---|
| A. Powdered sulfur | | 1.0 |
| B. High alumina cement | | 97.0 |
| Chemical composition of typical high alumina cement: | Silica ($SiO_2$) | 4.92 |
| | Iron oxide ($Fe_2O_3$) | 18.2 |
| | Alumina ($Al_2O_3$) | 39.17 |
| | Calcium oxide (CaO) | 36.03 |
| | Magnesia (MgO) | 1.54 |
| | Sulfuric anhydride ($SO_3$) | .14 |

The organic constituents of the powder, which comprise an accelerator and an antioxidant, constitute substantially 2% of the powder and should be present in approximately the following proportions:

| | Per cent |
|---|---|
| *Accelerator (zinc di-n-butyldithiocarbamate) | 0.5 |
| **Antioxidant ($N,N^1$ di-beta-naphthyl-p-phenylenediamine) | 1½ |

The composition of the powder may be summarized as follows:

| | Per cent |
|---|---|
| High alumina cement, the analysis of which is given above | 97.0 |
| Sulfur | 1.0 |
| Accelerator ("Butyl Zimate") | .5 |
| Antioxidant ("Age-rite White") | 1.5 |

The adhesive material above described is a self-setting material and loses its ability to flow freely in about forty-five minutes, so that the concentrated latex paste and dehydrating powder should not be mixed with one another until it is desired to make use of the material. The adhesive material, however, does not develop an initial set until about four hours old, and good strength or bond is ordinarily developed by the seventh day. Curing of the material, however, continues until about the fourteenth day when maximum strength has developed.

In preparing the adhesive material, it is preferable that the powder be mixed into the paste with a slow, uniform motion that tends to crush any powder lumps. This may be done either in a hand operated mixer or a power driven mixer. Likewise, the mixing of the paste and powder may be carried out in a vacuum to rid the mix of entrapped air. After the paste and powder have been suitably mixed together the material is ready for use.

In carrying out the invention, a predetermined amount of the powder and paste are first mixed together to give a mixture of the desired consistency. The mix can of course be varied as preferred but it is suggested that 8 parts powder and 5 parts paste by weight will give a mixture of normal consistency. The mixture is then ---
\* This accelerator is sold in the trade under the name of "Butyl Zimate."
\*\* This antioxidant is sold in the trade under the name of "Age-rite White."

adapted to be applied in a uniform layer to the back surface of the glass facing sheet or plate 10 and while the adhesive may be sprayed upon or otherwise applied to the glass it is preferred that it be spread or flowed thereon in the manner illustrated in Fig. 5. As therein shown, the glass facing sheet 10 to be coated is laid horizontally upon a suitable support 13 with the front or writing surface 11 of said sheet facing downwardly. The numeral 14 designates in its entirety the apparatus used for flowing or spreading a mass of the plastic adhesive material 15 above described upon the back surface of the glass sheet in the form of the relatively thin film or layer 12.

The spreading apparatus 14 comprises a substantially rectangular container including opposite end walls 16 having vertical rear edges connected together by a horizontal cross member 17. The forward edges 18 of end walls 16 preferably incline forwardly and downwardly and are connected together by a cross member 19 secured to said edges by screws or the like 20 provided with wing nuts 21. Carried by the cross member 19 is a metal plate 22 having its lower end directed forwardly to provide a substantially horizontal flange or lip 23 which is spaced above the glass sheet 10 and cooperates therewith to form an outlet of the desired width through which the adhesive material 15 flows. The cross member 19 is provided with slots 24 through which screws 20 are passed so that upon loosening of the screws the cross member can be moved vertically to vary the distance between the flange 23 and glass sheet 10 to increase or decrease the thickness of the layer of adhesive material 12 applied to the glass.

In practice, the glass facing sheet 10 is first laid upon the support 13 and the spreading apparatus 14 positioned thereover in such a manner that the end walls 16 thereof ride along on top of said support. A supply of the adhesive material 15 is then placed in the container and upon the glass sheet adjacent the outlet. The spreading apparatus 14 is then moved relatively slowly over the glass sheet in the direction indicated by the arrow (Fig. 5) from one end of the sheet to the opposite end thereof. When this is done, the adhesive will flow through the outlet beneath the flange 23 and be spread thereby upon the glass sheet in the form of a film or layer of uniform thickness. The pressure of the flange 23 upon the layer of adhesive 12 serves to force the adhesive firmly against the glass to improve the adhesion therebetween. As above stated, the adhesive material herein provided is a self-setting material so that after application thereof to the glass it is simply necessary to permit it to set whereupon the chalkboard is ready for use.

By means of the spreading apparatus 14 a uniform layer or film 12 of the adhesive material can be applied to the glass facing sheet or plate to give a uniform color when viewed through the glass. The chalkboard herein provided may be of any preferred color such as, for example, black, green, red, white, grey, etc.; this being accomplished by rendering the adhesive material of the desired color and which is visible through the glass. Thus, the adhesive material above described can be colored as desired by adding to the dehydrating powder a suitable pigment. Ordinary color or ceramic pigments may be used for this purpose. The pigment and the amount thereof used depends, of course, upon the color of adhesive material it is desired to obtain.

Although not essential, it may be preferred in some cases to apply a protective backing to the layer of adhesive material 12 as shown in Fig. 2, wherein such protective backing is indicated by the numeral 25. This backing may consist of waterproof paper, metal foil, etc.

In Fig. 3 is shown how the invention may be applied to a double chalkboard, consisting of two facing sheets or plates of glass 26 and 27. Applied to the inner surfaces of the glass sheets 26 and 27 are the layers of adhesive material 28 and 29, while the outer surfaces 30 and 31 of said sheets are ground, etched, sand-blasted, or otherwise suitably roughened to give the desired type of writing surface. In this form of chalkboard, the layers of adhesive material 28 and 29 are preferably, although not necessarily, of different colors. The two facing sheets are placed back to back in contact with one another and mounted in a suitable frame 32. The layers of adhesive material 28 and 29 may or may not be adhered to one another as preferred.

In Fig. 4 there is also illustrated a double chalkboard including two facing sheets or plates of glass 33 and 34 spaced from one another and mounted in a suitable frame 35. To the back surface of each facing sheet is applied a layer of adhesive material 36 covered by a suitable protective backing 37. The front surface 38 of each glass sheet is suitably treated to provide the desired writing surface.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

What is claimed is:

1. A backing for a glass chalkboard of the character described, comprising an adhesive material including a concentrated latex paste and a dehydrating powder mixed together to provide a self-setting plastic mix of the desired consistency.

2. A backing for a glass chalkboard of the character described, comprising an adhesive material including a concentrated latex paste and a high alumina cement powder that sets by hydration mixed together to provide a self-setting plastic mix of the desired consistency.

3. A backing for a glass chalkboard of the character described, comprising an adhesive material including a concentrated latex paste having a dry rubber content of approximately 68% to 70% and a dehydrating powder mixed together to provide a self-setting plastic mix of the desired consistency.

4. A backing for a glass chalkboard of the character described, comprising an adhesive material including a concentrated latex paste and a cement powder that sets by hydration having an alumina content of approximately 97% mixed together to provide a self-setting plastic mix of the desired consistency.

5. A backing for a glass chalkboard of the character described comprising an adhesive material including a concentrated latex paste having a dry rubber content of approximately 68% to 70% and a cement powder having an alumina content of approximately 97% mixed together to provide a self-setting plastic mix of the desired consistency.

6. A backing for a glass chalkboard of the character described, comprising an adhesive material including a concentrated latex paste of relatively high concentration having a low protein content and including a stabilizer and preservative, and a powder comprising a high alumina cement that sets by hydration, a vulcanizing agent, an accelerator and an antioxidant, said paste and powder being mixed together to provide a self-setting plastic mix of the desired consistency.

7. A backing for a glass chalkboard of the character described, comprising an adhesive material including a concentrated latex paste having a dry rubber content of approximately 68% to 70% and a stabilizer and preservative, and a cement powder containing approximately 97% alumina, a vulcanizing agent, an accelerator and an antioxidant, said paste and powder being mixed together to provide a self-setting plastic mix of the desired consistency.

8. A backing for a glass chalkboard of the character described, comprising an adhesive material including a concentrated latex paste of relatively high concentration having a low protein content and including a relatively small amount of a stabilizer and preservative selected from the group consisting of ammonia and caustic alkali, and a powder comprising a high alumina cement, a vulcanizing agent such as sulfur, an accelerator such as "Butyl Zimate" and an antioxidant such as "Age-rite White," said paste and powder being mixed together to provide a self-setting plastic mix of the desired consistency.

9. A backing for a glass chalkboard of the character described, comprising an adhesive material including a concentrated latex paste having a dry rubber content of approximately 68% to 70% and a stabilizer and preservative selected from the group consisting of ammonia and caustic alkali, and a cement powder comprising approximately 97% alumina, a vulcanizing agent such as sulfur, an accelerator such as "Butyl Zimate" and an antioxidant such as "Age-rite White," said paste and powder being mixed together to provide a self-setting plastic mix of the desired consistency.

10. A backing for a glass chalkboard of the character described, comprising an adhesive material including a concentrated latex paste containing the following ingredients in the approximate proportions:

| | Per cent |
|---|---|
| Dry rubber | 68.45 |
| Water | 30. |
| Ammonia | 0.05 |
| Natural proteins | 0.8 |
| Caustic alkali (KOH) | 0.7 | and a dehydrating powder containing the following ingredients in the approximate proportions:

| | Per cent |
|---|---|
| High alumina cement | 97. |
| Sulfur | 1. |
| Accelerator ("Butyl Zimate") | .5 |
| Antioxidant ("Age-rite White") | 1.5 | said paste and powder being mixed together to provide a self-setting plastic mix of the desired consistency.

ADELAIDE M. GREAVES-WALKER,
*Executrix of the Estate of*
*Arthur McK. Greaves-Walker, Deceased.*